Patented June 10, 1930

1,762,483

UNITED STATES PATENT OFFICE

STANLEY M. NORWOOD, OF BROOKLYN, NEW YORK, ASSIGNOR TO ELECTRO METALLURGICAL COMPANY, A CORPORATION OF WEST VIRGINIA

WELDING ROD

No Drawing.    Application filed October 24, 1925.    Serial No. 64,690.

This invention relates to welding and similar operations wherein metal in fluid form is caused to be deposited on heated or superficially-fluid solid metal and relates especially to the metal which is added in such operations. More particularly, the invention pertains to chrome-iron alloys adapted to be used in the welding of high chromium ferrous alloys and for other purposes.

Commercial chrome-iron alloys, for example those containing 10 to 35 percent of chromium, usually contain from 0.2 to 0.5 per cent silicon, and have a manganese content approximately within the same range. Such compositions can be used as welding rods, but in welding with them an excess of acetylene must be supplied to the welding flame. Under these conditions the carbon content of the deposited metal is high, and the metal is hard and difficult to machine. It is usually necessary to heat-treat the deposited metal to diminish its brittleness and hardness, and to increase its machinability.

If, a so-called "neutral flame" is used, spongy and otherwise unsatisfactory deposits are obtained when welding with chrome-iron alloys of usual composition except when the part to be welded is very thin; i. e., of a thickness of less than one-eighth of an inch. This is probably due at least in part to the formation of highly infusible oxides of chromium which prevent the solidification of the fused metal to a dense mass free from blowholes, slag and oxide films.

I have found that by using a chrome-iron welding rod containing a substantially increased amount of silicon and with or without a content of nickel, satisfactory welds on material of any thickness can be obtained with the use of a neutral flame.

The metal lies quietly in the weld and unites easily and thoroughly with the base metal. A slag, which spreads over and adheres to the surface of the weld and base metals thus protecting the molten metal from oxidation, is also formed.

Good results may be obtained by using rods of a composition within the following range of proportions:

Carbon _____ 0.10 to 1.00%
Manganese _____ 0.10 to 3.00%
Silicon _____ 0.75 to 3.00%
Chromium _____ 10.00 to 35.00%
Nickel _____ 0.00 to 15.00%
Balance principally iron.

In welding a given commercial chrome-iron the best results are obtained by using a welding rod containing chromium in approximately the same proportion as in the base metal and containing from 1 to 2.5 percent silicon, more than 1 percent of manganese, and about 10 percent nickel.

In comparison with the compositions heretofore used, good results have been obtained by using high chromium welding rods containing from 1 to 2.5 percent silicon, a normal percentage of manganese, i. e., approximately .50 percent, and no nickel. However, nickel improves the ductility of the deposited metal by refining the grain. It also increases the fluidity of the metal under the blow torch. The fluidity of the slag which forms on the weld metal may be improved by increasing the proportion of manganese in the welding rod and the best results have been obtained with rods containing more than 1 percent of manganese. However, manganese may be varied over a wide range without sacrificing the advantages of the invention.

Best results are obtained with carbon near the lower limit specified. However, where a high carbon weld is desired for some special uses the carbon content may be as high as 3.5 percent.

The following are examples of welding rod compositions with which very good results have been obtained in welding alloys containing from 20 to 35 percent chromium:

|  | A | B | C | D | E |
|---|---|---|---|---|---|
|  | Per cent | Per cent | Per cent | Per cent | Per cent |
| Carbon | 0.29 | 0.32 | 0.14 | 0.20 | 0.18 |
| Chromium | 22.77 | 24.78 | 25.78 | 25.70 | 26.36 |
| Manganese | 0.53 | 0.54 | 1.68 | 1.92 | 0.40 |
| Nickel |  |  |  | 10.26 | 10.37 |
| Silicon | 2.38 | 1.20 | 1.94 | 1.87 | 2.00 |

The balance in each instance consists principally of iron.

Deposited metal showing a tensile strength in excess of 68,000 pounds per square inch and showing more elongation than cast chome-iron alloys of usual composition has been obtained. The actual elongation is slight but sufficient to indicate the absence of brittleness. Rods with compositions similar to those above-mentioned, but containing approximately 15 percent chromium, are preferred for welding base metal containing from 10 to 20 percent chromium. Rods of the compositions named can be easily forged and rolled.

Rods of the compositions named give satisfactory results when used in electric welding, provided they are coated with a suitable flux. As examples of such fluxes, those disclosed in the application of Wilber B. Miller, filed September 22, 1925, Serial No. 57,944, may be used. The best results are obtained by using a rod with the silicon content within the range of 1–2.5 percent, but with such a rod a coating low in silicon should be used.

The expression "high chromium" as used herein is intended to refer to those ferrous alloys containing chromium in amounts of 10% and upwards.

I claim:

1. A welding rod consisting of an iron alloy containing: carbon 0.1% to 1.0%, chromium 10% to 35%, manganese 0.1% to 3.0%, and silicon 0.75% to 3.0%.

2. A welding rod consisting of an iron alloy containing: carbon about 0.3%, chromium about 25%, manganese 0.5% to 3%, and silicon about 2.0%.

3. A welding rod consisting of an iron alloy containing: carbon about 0.3%, chromium about 25%, manganese 0.5% to 3%, nickel about 10%, and silicon about 2.0%.

4. The process of welding high chromium ferrous alloys comprising alloying iron with a quantity of chromium ranging from 10% to 35% and with silicon ranging from 1% to 2.5%, working the alloy into convenient portions, coating the portions with a slag forming material, and fusing the alloy under the protection of the slag into a fusion contact with a chromium containing alloy to form a weld.

In testimony whereof, I affix my signature.

STANLEY M. NORWOOD.